United States Patent [19]

Cocanougher et al.

[11] Patent Number: 5,249,149
[45] Date of Patent: Sep. 28, 1993

[54] METHOD AND APPARATUS FOR PERFORMING FLOATING POINT DIVISION

[75] Inventors: Daniel Cocanougher, Ft. Worth; Peter W. Markstein, Austin, both of Tex.

[73] Assignee: International Business Machines Corporation, Armonk, N.Y.

[21] Appl. No.: 755,588

[22] Filed: Sep. 3, 1991

Related U.S. Application Data

[63] Continuation of Ser. No. 563,886, Aug. 6, 1990, abandoned, which is a continuation of Ser. No. 297,771, Jan. 13, 1989, abandoned.

[51] Int. Cl.$^5$ .............................................. G06F 7/52
[52] U.S. Cl. .................................... 364/748; 364/765
[58] Field of Search ................................. 364/748, 765

[56] References Cited

U.S. PATENT DOCUMENTS

| | | | |
|---|---|---|---|
| 3,508,038 | 4/1970 | Goldschmidt et al. | 364/765 |
| 3,633,018 | 1/1972 | Ling | 364/765 |
| 3,648,038 | 3/1972 | Sierra | 364/765 |
| 3,777,132 | 12/1973 | Bennett, Jr. | 364/765 |
| 4,011,439 | 3/1977 | Bennett | 364/761 |
| 4,413,326 | 11/1983 | Wilson et al. | 364/748 |
| 4,442,498 | 4/1984 | Rosen | 364/745 |
| 4,481,600 | 11/1984 | Asai | 364/765 |
| 4,594,680 | 6/1986 | Schomburg et al. | 364/765 |
| 4,707,798 | 11/1987 | Nakano | 364/765 |
| 4,779,218 | 10/1988 | Javch | 364/765 |

FOREIGN PATENT DOCUMENTS 0154182  6/1985  European Pat. Off. .

OTHER PUBLICATIONS

ANSI/IEEE Std. 754-1985, entitled "An American National Standard—IEEE Standard for Binary Floating—Point Arithmetic".
Elektronik, vol. 35, No. 17, Aug. 22, 1986, pp. 57-61 Taetow, "Schnelle Gleitkommadivision".

Primary Examiner—David H. Malzahn
Attorney, Agent, or Firm—Wayne P. Bailey; Thomas E. Tyson

[57] ABSTRACT

A method for performing floating point division is provided for producing a quotient having a mantissa of n bits. The method consists of the steps of accessing an initial guess of a reciprocal of the divisor from a table of divisor reciprocals, computing an initial estimate the quotient in a corresponding estimate from the initial estimate of the reciprocal, increasing the precision of the mantissa of the reciprocal estimate, quotient estimate, and remainder estimate by computing an error parameter and iteratively computing a current reciprocal estimate, a current quotient estimate and a current remainder estimate from the error parameter and the latest reciprocal estimate, quotient estimate and remainder estimates. Also, the step of increasing the precision is repeated until the quotient estimate and reciprocal estimate exceed n bits. Lastly, the final quotient is computed from the last current quotient estimate plus the last current reciprocal estimate times the last current remainder estimate. A floating point apparatus is also provided that implements the floating point division method. The application of this method and apparatus provide a quotient result that is correctly rounded without conditionally testing the magnitude of the quotient.

28 Claims, 6 Drawing Sheets

METHOD AND APPARATUS FOR PERFORMINING FLOATING POINT DIVISION

This is a continuation of application Ser. No. 07/563,886Aug. 6, 1990, which in turn is a continuation of application Ser. No. 07/297,771, Jan. 13, 1989, both expressly abandoned.

DESCRIPTION

1. Related Cases

This patent application is related to U.S. Pat. No. 5,075,840 issued Dec. 24, 1991 entitled "Tightly Coupled Multiprocessor Instruction Synchronization"; U.S. Pat. No. 4,961,162 issued Oct. 2, 1990 entitled "Multiprocessing System for Performing Floating Point Arithmetic Operations"; and U.S. Pat. No. 4,999,802 issued Mar. 12, 1991 entitled "Floating Point Arithmetic Two Cycle Data Flow".

2. Field of the Invention

This invention relates to data processing system and performing floating point operations and more specifically to a data processing system performing a floating point division operation.

3. Background Art

Traditionally floating point division operations have included the computing of a quotient in a computer by first generating an estimate of the reciprocal of the divisor. The reciprocal is refined, in other words the precision of mantissa is increased, and eventually multiplied by the dividend to produce a quotient. This method has often been plagued with the problem of getting the last bit of the mantissa correct in all cases of the division.

Computers which have used this technique in the past have been notorious for not always producing the expected results, and these deviations were most disturbing for situations in which an exact quotient should be expected, but the hardware, using the sort of scheme described in the earlier paragraph, simply got the last bit wrong some of the time.

With the Institute of Electrical and Electronic Engineers providing a standard for a floating point arithmetic, the standard has been set which describes the correct results for floating point arithmetic operations. This standard is entitled "An American National Standard—IEEE Standard For Binary Floating-Point Arithmetic", ANSI/IEEE Std. 754-1985, herein incorporated by reference. A computer that purports to support the IEEE floating point standard must get the correct results in all cases.

Several patents illustrate the techniques for performing a floating point divide operation. U.S. Pat. No. 4,442,492 discloses a data processing system that includes a technique for inserting a round bit in the appropriate bit of the floating point mantissa. U.S. Pat. No. 4,413,326 discloses a mechanism for performing floating point calculations in a variable number of steps using a primary microprocessor and second microprocessor where each microprocessor includes its own control read only memory. Floating point operations include the participation of both microprocessors. In executing the division operation mantissa are preconditioned to be normalized, the most significant bit being a logical 1. The operation proceeds until the leading bit of the mantissa becomes a 1 signifying the completion of the operation.

U.S. Pat. No. 4,481,600 discloses a technique of generating quotients from successive iterations.

Other prior art that addresses floating point division includes U.S. Pat. No. 4,707,798 which discloses a divide method using an approximate reciprocal divisors to calculate the quotient. The patent discloses a method that can shorten the time required for performing check and correction after intermediate quotients have been calculated through the successive iteration process.

U.S Pat. No. 3,508,038 discloses an apparatus for dividing a fractional binary dividend by a fractional binary divisor wherein the quotient is developed by performing successive multiplications of the dividend and approximate reciprocals of the divisor. U.S. Pat. No. 4,011,439 discloses an accelerated method of generating quotients of two binary numbers. A divisor array is utilized to affectively form the reciprocal of the binary divisor and the quotient is determined by multiplying the reciprocal with the dividend. U.S. Pat. No. 3,648,038 discloses a method for obtaining the reciprocal of a number of using a flow-through technique. In this method the reciprocal of the divisor is multiplied with the dividend to produce the desired quotient. U.S. Pat. No. 3,633,018 discloses a method which is used to find the reciprocal of a number with two multiplications and the quotient of the two numbers with three multiplications. U.S. Pat. No. 3,777,132 discloses a method for performing a binary division by multiplying the reciprocal of a divisor by a dividend. The quotient is generated at the same time as the reciprocal of the divisor.

It is an object of the present invention to provide a method for performing a floating point division according to the IEEE arithmetic standard that can be implemented using multiplication and addition data processing circuitry. It is a further object of the invention to provide a method for ensuring that the bits of the mantissa are correct according to a preselected rounding mode without the use of any conditional testing to adjust the final result.

SUMMARY OF THE INVENTION

In accordance with the present invention a method is provided for performing floating point division of a dividend by a divisor for producing a quotient having a mantissa of n bits. The method consists of the steps of (1) accessing an initial guess of a reciprocal of the divisor from a table of divisor reciprocals, (2) computing an initial guess of the quotient and a corresponding remainder guess form the initial guess of the reciprocal, (3) increasing the precision of the mantissa of the reciprocal guess, the quotient guess and the remainder guess by computing an error parameter and iteratively computing a current reciprocal guess, a current quotient guess and a current remainder guess from the error parameter and the initial reciprocal guess, initial quotient guess and initial remainder guess, (4) repeating steps (3) until the precision of the reciprocal guess and the precision of the quotient guess exceeds n bits, and (5) computing a final quotient from the last current quotient guess plus the latest current reciprocal guess times the latest remainder guess.

Also in accordance with the present invention an apparatus for performing a floating point division is provided wherein the floating point division is a division of a dividend by a divisor that produces a quotient having a mantissa of n bits. The apparatus includes a circuit for computing an initial guess of a reciprocal of the divisor. Also, a circuit for computing an initial guess of the quotient from the initial guess of the reciprocal is included. Circuitry for increasing the precision of the initial guess of the reciprocal guess by computing an error parameter and computing a current guess of the reciprocal from the error parameter and the initial guess of the reciprocal is provided. A circuit for increasing the precision of the mantissa of the initial guess of the quotient by computing a current quotient from the current guess of the reciprocal is also provided. Also, a circuit for computing a remainder guess from the current reciprocal guess and the current quotient guess is provided. A circuit for increasing the precision of the mantissa of the reciprocal quotient and remainder are provided. The precision is increased until the precision of the reciprocal and the quotient exceeds n bits. Lastly, a circuit is provided that computes a final quotient from the last current quotient plus the last current reciprocal times the last remainder.

In the preferred embodiment, a method and apparatus for performing floating point division is provided. Initially floating point division is accomplished as previously described implementing a rounding scheme by performing round-to-nearest operations. When performing the final operation, i.e., the computation of the final quotient, other rounding schemes may be used such as round-to-zero, round toward negative infinity or round toward positive infinity as well as round-to-nearest.

Also in this invention, a mechanism is provided to signal when an exact quotient has been calculated. This is accomplished when the remainder that is computed is zero.

BRIEF DESCRIPTION OF THE DRAWING

The novel features believed characteristic of the invention are set forth in the appended claims. The invention itself, however, as well as other features and advantages thereof will be best understood by reference to the following description of the preferred embodiment, when read in conjunction with the accompanying figures, wherein:

BEST MODE FOR CARRYING OUT THE INVENTION

The method for performing the floating point division that will be discussed addresses only the treatment of the mantissa of the operands and results. The treatment of exponents is well known in the art so will not be addressed in this discussion. The five steps of the division will now be discussed.

1. Initially a divisor reciprocal guess is chosen. For divisors whose mantissa consists of all one bits, the magnitude of the initial approximation of the reciprocal of the divisor must be greater than or equal to the magnitude of the actual reciprocal of the divisor. In the preferred embodiment, the magnitude of the initial guess of the reciprocal of the divisor must be greater than or equal to the magnitude of the actual reciprocal of the divisor correctly rounded using a rounded-to-nearest operation. Rounding will be discussed at a later point in this specification.

2. For divisors whose mantissa consists of all one bits, the initial approximation of the quotient must be greater or equal in magnitude to the magnitude of the actual quotient (correctly rounded using the rounded-to-nearest operation in the preferred embodiment). The sign of the approximation is an exclusive-or of the signs of the operands.

3. An improved approximation of the reciprocal is generated from a previous approximation by computing an error parameter. The error parameter "e" is as follows:

$$e = 1.0 - b*y$$

$$y' = y + e*y$$

where y' is the improved approximation. All bits for the products of these two equations must participate in sums before rounding to the machine's normal mantissa length.

4. An improved approximation of the quotient "q'" is generated by using the previous approximation of the quotient by the following computations:

$$r = a - b*q$$

$$q' = q + r*y,$$

where y was computed in accordance with step 3. All bits of the above products must participate in the sums before rounding to the machine's normal mantissa length.

5. If an approximation to a quotient is known to be correct within one unit in the last place, the magnitude of the reciprocal of the divisor used to improve the approximation to the quotient must be equal to the magnitude of the actual reciprocal of the divisor correctly rounded (using rounded-to-nearest operation), except for the divisor whose mantissa consists of all one bits, for which the magnitude of the approximation may also be smaller than the correctly rounded reciprocal by one unit in the last place. The required reciprocal will have resulted from iterative applications of step 3.

In order to clearly understand the inventive method, the techniques of rounding must also be understood. Generally, there are four rounding modes. The first rounding mode termed round-to-nearest which selects the closest representable number in the mantissa. The second possibility is a round-to-zero which discards the fractional bits that don't fit in the mantissa. This is commonly termed truncation. Another rounding mode is the round-to-positive infinity which means that the rounding is accomplished by rounding to the next largest representable number. Conversely, round-to-negative infinity includes rounding to the next smaller representative number. In practice the round-to-nearest operation is the most difficult, and the round-to-zero operation the simplest. The round-to-positive infinity and round-to-negative infinity are between in complexity.

In the preferred embodiment the floating point arithmetic unit performs one primitive operation:

$$A + B*C$$

with three variations (a) −A+B*C; (b) −A−B*C; and (c) A−B*C. In this embodiment each primitive operation is performed with only one rounding error (i.e., rounding is accomplished at the last stage of computation). In this embodiment ordinary addition and subtraction are accomplished by inserting a 1.0 for the C operand, an ordinary multiplication is realized by having a 0.0 provided for the A operand.

The purpose of this invention is implement a floating point arithmetic division operation in accordance with the IEEE floating point standard. The IEEE floating point standard is herein incorporated by reference.

Figure 1:
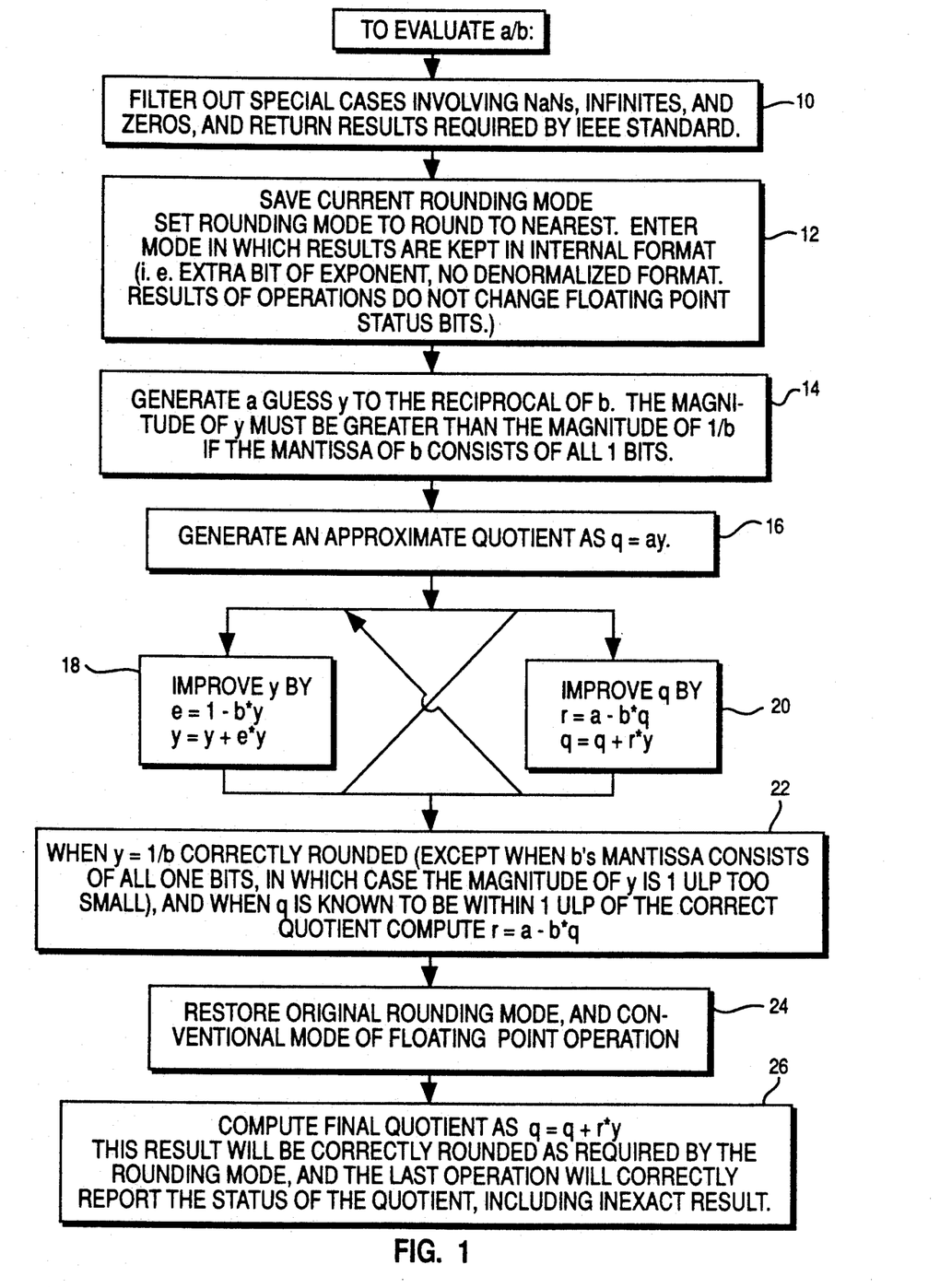
FIG. 1 if a flow chart illustrating the floating point division method.

FIG. 1 is overall flow chart illustrating the inventive method. The inventive method is to accomplish the division of a by b. In step 10 numbers such as infinities and zeros together with numbers that do not represent numeric values are removed from the computation. In other words, when such numbers are encountered, the results required by the IEEE standard is returned. In step 12 the current rounding mode is changed from whatever the current rounding mode is to a round-to-nearest operation. In step 14 an initial guess of the reciprocal of the divisor is made. If the divisor mantissa is all one bits, the magnitude of the reciprocal must be greater than the actual magnitude of 1/b. In step 16 the reciprocal y is used with a to compute an initial guess of the quotient. In steps 18 and 20 the reciprocal y and the quotient q are improved. Improved means that the precision of the mantissa of the reciprocal and the quotient are increased. In step 18 the error term e is computed as shown. This error term is then used to recompute the current guess or estimate of the reciprocal y as shown. Likewise in step 20, the quotient is "improved" by first computing the remainder using the dividend and the divisor together with the last estimate of the quotient and estimating a new quotient by using the last quotient the computed remainder and the latest estimate of the reciprocal. Steps 18 and 20 can be performed iteratively and in either order relative to each other. In step 22, when the reciprocal y and the quotient q have been iteratively improved to the point where their precision exceeded the precision of the mantissa before the results were rounded, the final remainder is computed as shown. In step 24, the original rounding mode is restored. In step 25 the final quotient is computed as shown.

Figure 2:
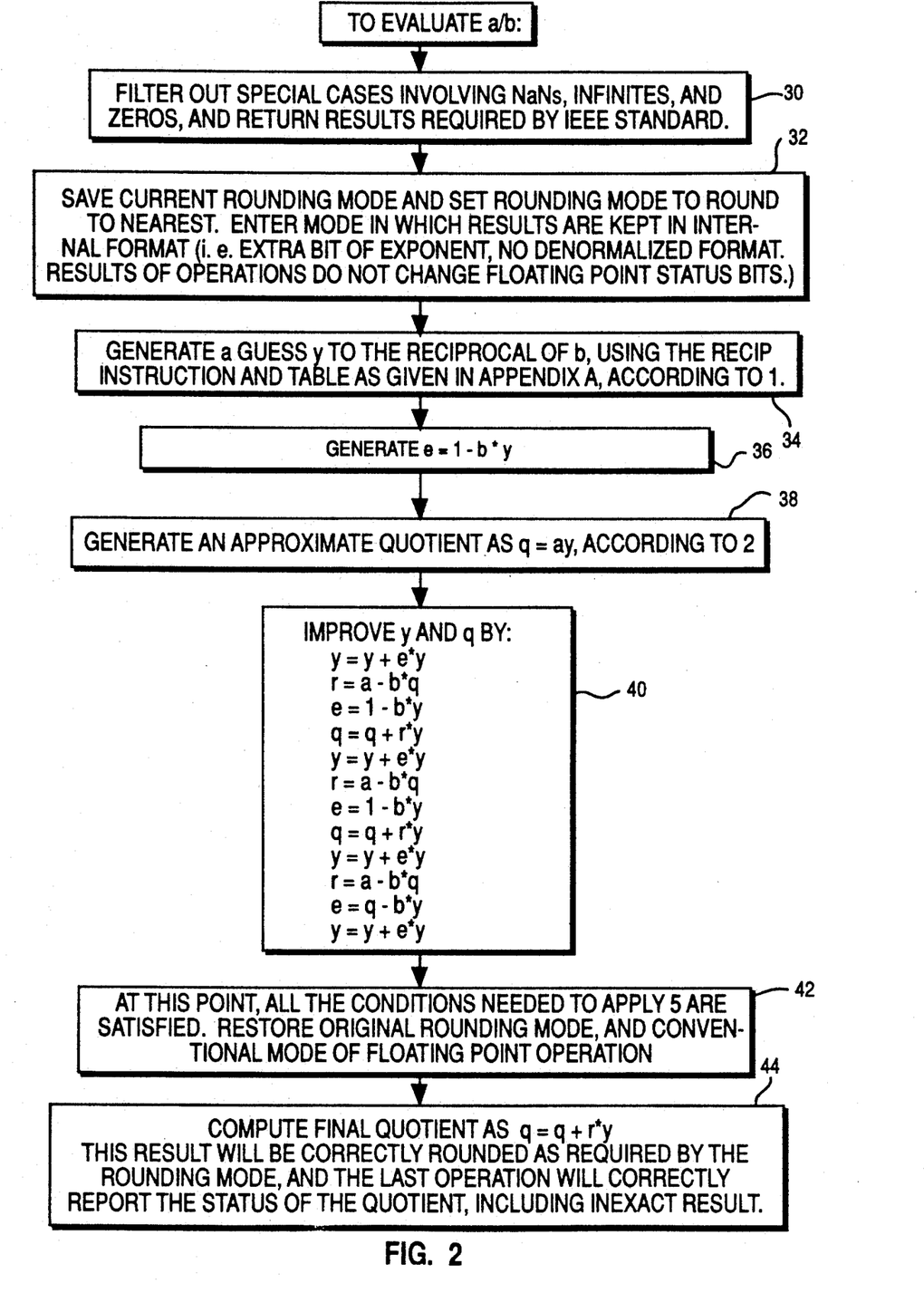
FIG. 2 is a flow chart illustrating a first preferred embodiment of the floating point division method.

FIG. 2 illustrates a first preferred embodiment of the inventive method. In step 30 the non-numbers, infinities and zeros are filtered out by providing the results dictated by the IEEE standard. In step 32 the current rounding mode is changed to round-to-nearest operation. In step 34 an initial guess of the reciprocal y is made by accessing a table as illustrated in Appendix A. In step 36 the error term e is computed as shown. In step 38 the first approximation of the quotient q is made. In step 40, the quotient q and the reciprocal y are "improved" by performing the computations in accordance with the sequence shown. In step 42 the original rounding mode is restored. In step 44 the final quotient is computed is shown.

Figure 3:
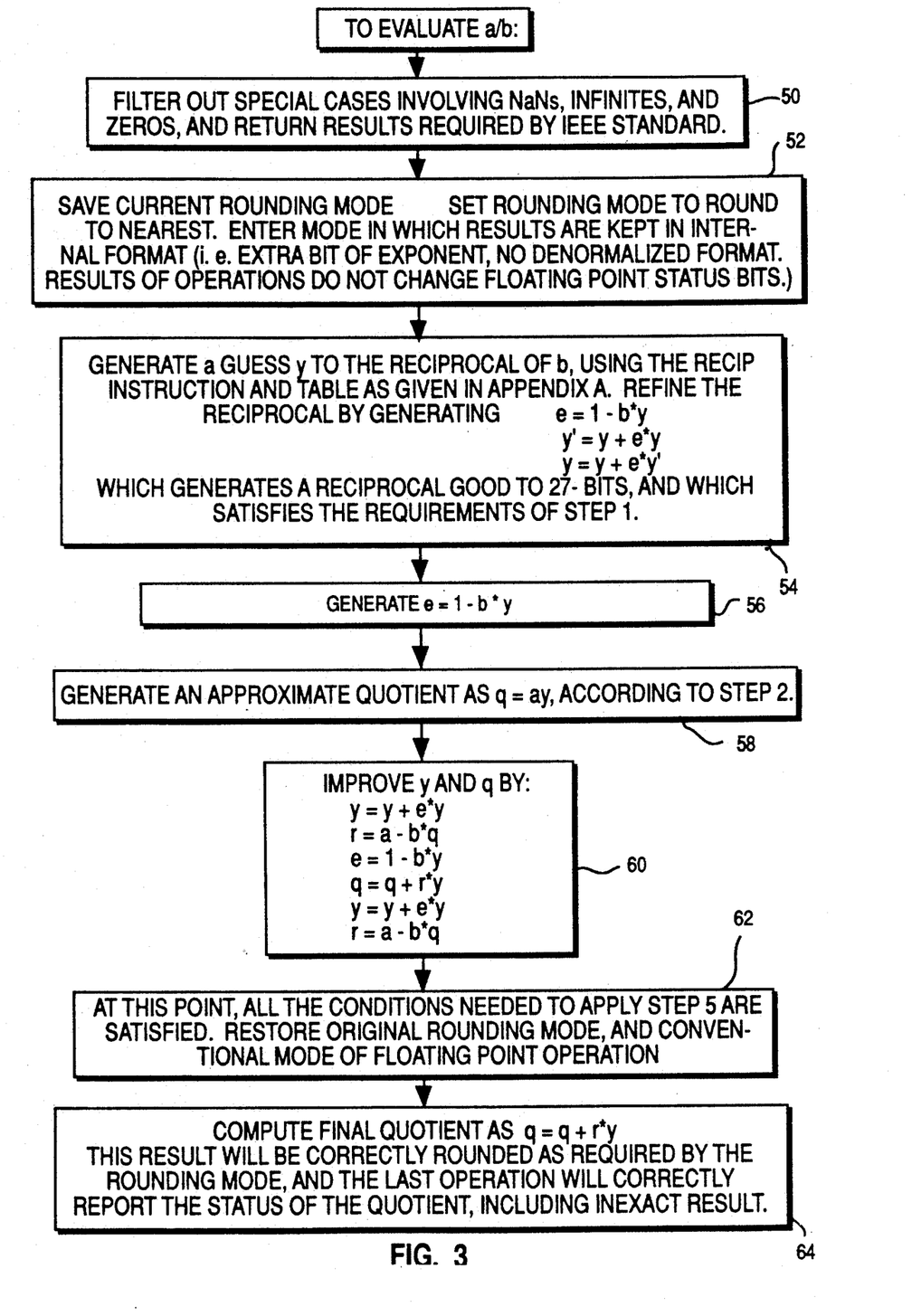
FIG. 3 is a flow chart illustrating a second preferred embodiment of the floating point division operation.

FIG. 3 illustrates a second preferred embodiment of the inventive method. In step 50 the non-numbers, infinities and zeros are filtered as before. In step 52 this current rounding mode is altered to a round-to-nearest operation. In step 54 the initial guess of the reciprocal is made according to the table in Appendix A. The reciprocal is then refined by the computation of the error term e as shown and the following reciprocal calculations. In step 56 the error term e is recomputed using the latest reciprocal estimate. In step 58 the quotient estimate is generated. In step 60 the mantissa of the reciprocal and quotient are "improved" as shown be preforming the computations illustrated. In step 62 the original rounding mode is restored. In step 64 the final quotient is computed.

It should be noted that in both preferred embodiments that included in the last step of computing the final quotient, an indication is given when the quotient is exact (i.e., when the remainder is zero). The indication provided as to quotient exactness is a result of the quotient sum being characterized as exact.

Figure 4:
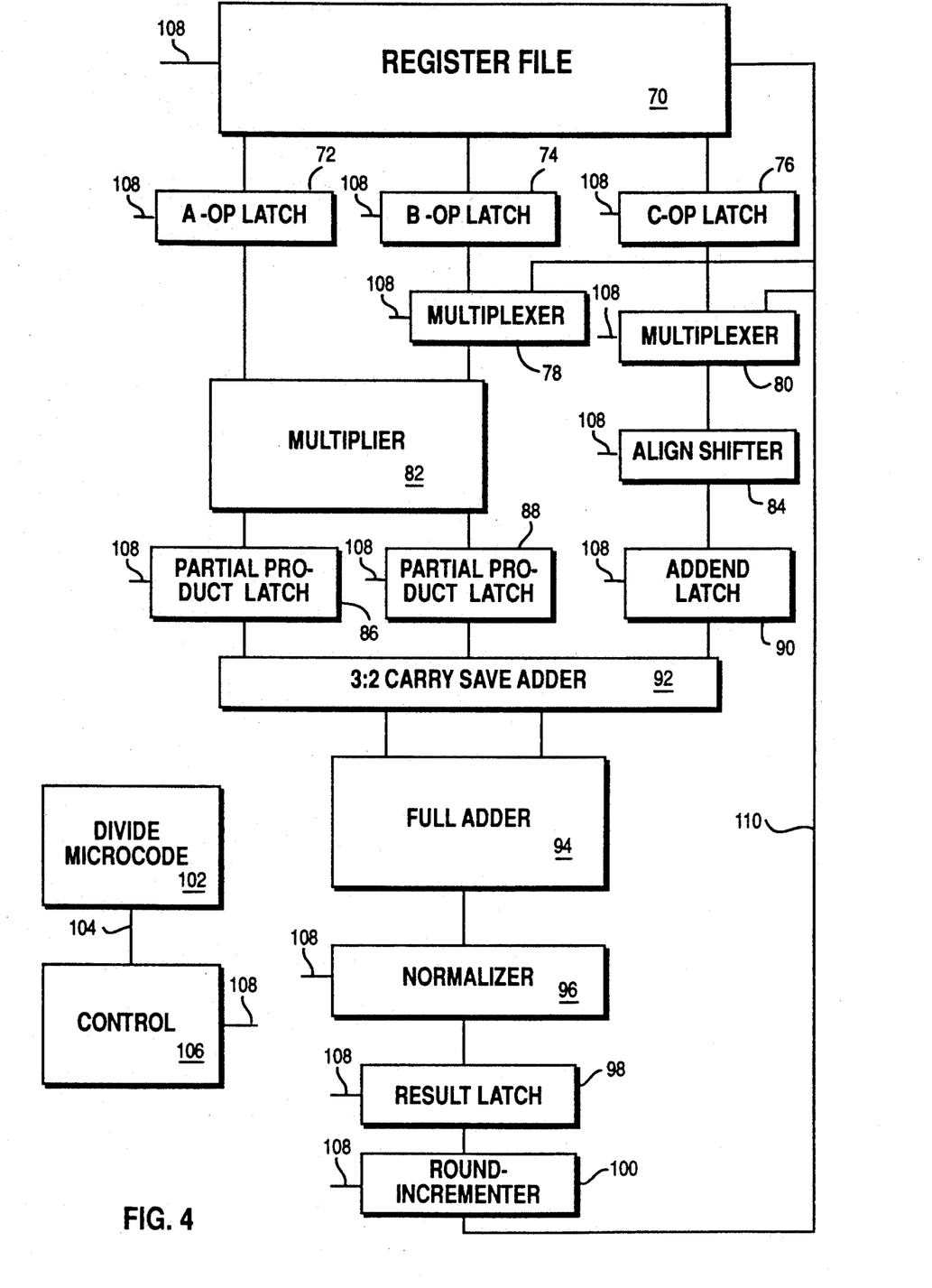
FIG. 4 is a block diagram illustrating the floating point arithmetic unit.

FIG. 4 is a block diagram of a floating point arithmetic unit. This particular floating point unit provides for a multiplication and addition operation to occur in parallel. In the preferred embodiment, register file 70 contains 40 floating point arithmetic words. Under the control of control circuitry 106 through control line 108 a floating point arithmetic data word is loaded into the A OPERATION LATCH 72. Likewise, the contents of B OPERATION LATCH 74 and C OPERATION LATCH 76 are loaded. The contents of the A OPERATION LATCH 72 and B OPERATION LATCH 74 are provided to a multiplier 82. The contents of the B OPERATION LATCH 74 passes through a multiplexor 78 to be explained later. The multiplier 82 provides a partial product to latch 86 and a second partial product to latch 88. The C OPERATION LATCH 76 provides the floating point number through multiplexor 80 to an align shifter 84. The output of the align shifter 84 is provided to the addend latch 90. It should be understood that the contents of the registers that are operated on by the multiplier 82 and the align shifter 84 is that of the mantissa of the floating point number. The operation of multiplication of the exponent is provided in the control circuitry 106 and consists of addition. The result of the exponent calculation provides an input to the alignment shifter 84 to properly shift the contents of the C OPERATION LATCH so it may be added to the product of the A OPERATION LATCH 72 and B OPERATION LATCH 74.

The 3:2 carry save adder 92 receives the contents of latches 86, 88 and 90. Two outputs are provided to the full adder 94. The contents of the full adder 94 is normalized in the normalizing circuit 96 and then stored in the result latch 98. The output of the result latch 98 is provided to the round incrementor 100. The output of the round incrementor 100 can be provided to the register file 70 or as a substitute for multiplexor 78 to the multiplier or through the multiplexor 80 to the align shifter 84. Since this floating point arithmetic logic unit operates in the pipeline fashion, by providing multiplexor 78 and 80, results from a previous instruction may be used for a successive instruction without being stored in the register file 70.

In the divide operation, the control circuitry 106 functions with a divide microcode control circuit 102 via line 104 to implement the divide procedures illustrated in FIGS. 1, 2, and 3.

Figure 5:
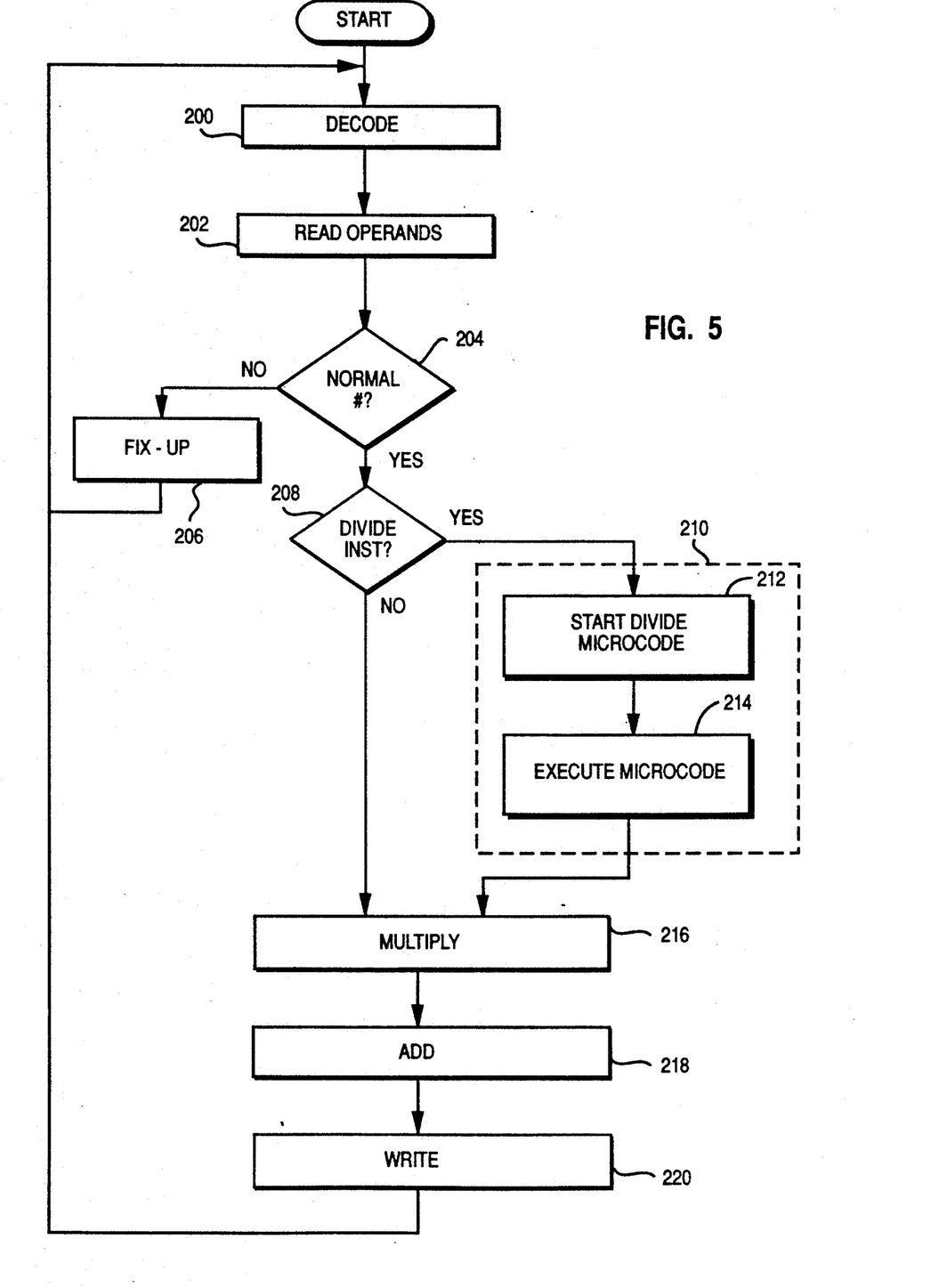
FIG. 5 is a flow chart illustrating the operation of the control circuitry for the floating point arithmetic unit.

FIG. 5 illustrates the control flow of the control circuit 106. Initially, the floating point instruction is decoded in step 200 and the operands are read in step 202 (from the register file 70). In step 204, a determination is made as to whether or not the operands are normal numbers (corresponding to step 30, FIG. 2, filtering out special cases). If the operands are not normal numbers, the control flow proceeds to step 206 to "fix-up" the numbers according to the IEEE standard and the control flow returns to step 200. However, if the numbers are normal numbers, the control flow proceeds to step 208 to determine if there is a divide instruction present. If there is no divide instruction, the control flow proceeds to step 216. If there is a divide instruction present, the control flow proceeds to the divide microcode 210 including step 212 which initiates the divide microcode procedure and step 214 which executes the microcode. After step 214, the control flow proceeds to step 216 to perform a multiply operation. Then in step 218, an add operation is performed followed by step 220 which is the write back into the register file 70. Step 216 (the multiply step) corresponds to the multiplication of the remainder r by the reciprocal in step 44. Step 218 of FIG. 5 corresponds to the adding of the quotient to the remainder times reciprocal in step 44. The write back to register step 220 corresponds to the writing of the final quotient into the register file 70.

Figure 6:
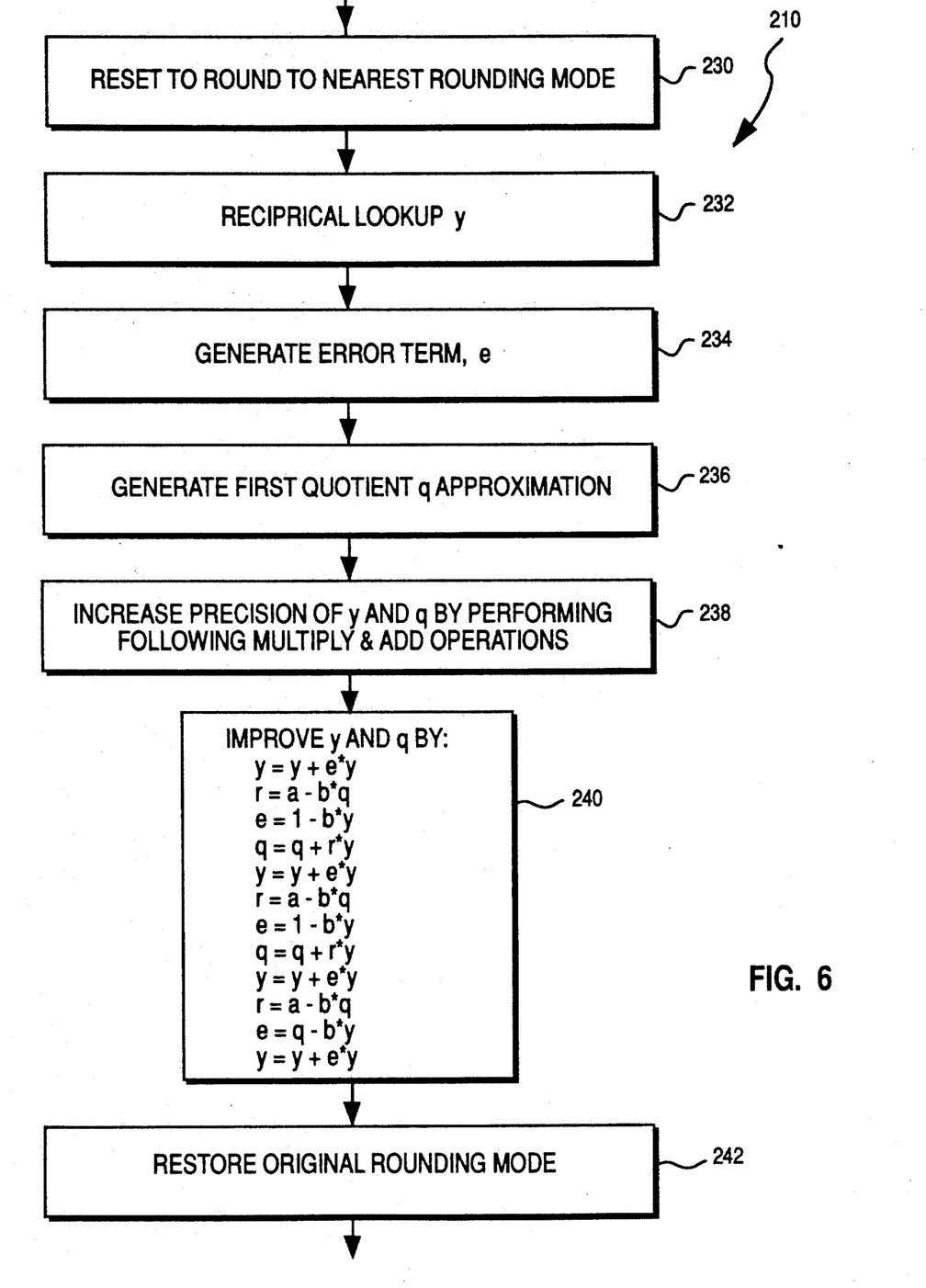
FIG. 6 is a flow chart illustrating the operation of the divide floating point control unit.

FIG. 6 illustrates the contents of the divide microcode 210. Initially, in step 230, the rounding mode is reset to round to nearest rounding mode. In step 232, the reciprocal y is looked up in the look-up table for the first reciprocal guess. In step 234, the error term e is generated. In step 236, the first approximation of the quotient q is made. In step 238 and 240, the precision of the reciprocal y and the quotient q are increased by performing the calculations listed in step 240. In step 242, the original rounding mode is restored.

As previously discussed, the multiply step 216, the add step 218 and the write back step 220 then correspond to the computation and storing of the final quotient (step 44, FIG. 2).

As a result of the operation of the floating point unit, the quotient resulting from the floating point division operation is correct to the desired precision without requiring any additional circuitry.

Although the invention has been described with reference to these specific embodiments, this description is not meant to be construed in a limiting sense. Various modifications of the disclosed embodiment, as well as other embodiments of the invention, will become apparent to those persons skilled in the art upon reference to the description of this invention. It is, therefore, contemplated that the appended claims will cover any such modifications or embodiments as may fall within the true scope of the invention.

APPENDIX A

This appendix describes the generation of a first approximation to the reciprocal of a number, as required by the preferred embodiments of this invention. The table at the end of the description generates approximations in keeping with the instant invention.

The operation RECIP Y,B is a floating point operation. Y and B are both floating point registers. The result of the operation is to put into register Y an approximation to the reciprocal of B. A specification for this operation follows below:

---
If B is a NaN, then Y = B;
  else if B is plus or minus infinity, the Y is plus or
    minus zero;
  else if B is plus or minus zero, then Y is plus or
    minus infinity;
  else
    if B is denormalized, then represent B in normalized
      internal form.
    Sign of Y = sign of B.
    Unbiased exponent of Y = 1 − unbiased exponent of B
    Leading 9 fraction* bits of Y = table (leading 8
      fraction* bits of B).
---

*Note: By 'leading 8 fraction bits' or 'leading 9 fraction bits' exclude the leading implied 1 bit that is not physically represented in the IEEE format. In other words, for a normalized number, 'the leading 8 fraction bits' are bits 12–19 of the double word, in the usual IBM left-to-right bit numbering, starting at zero.

With the table given, $0 < = ABS(1-BY) < = 1/362$, except for the special cases involving zeros, infinities, and NaN. In particular, for the divisor of all-ones, the construction of the RECIP operation will overestimate the magnitude of the reciprocal, as is required to guarantee convergence to a correctly rounded result.

RECIP need not be exposed in the computer architecture, but instead, it may only be available for use by the DIVIDE instruction. In that case, it may not be necessary to cope with NaNs, infinities, or zeros, since these cases would be treated as special cases by the hardware.

Below, in hexadecimal, is the table necessary to construct the fraction required by the RECIP operation for long format IEEE numbers: (table positions and contents are given in hexadecimal. The table values, 9 bits long, are left adjusted).

| | | | | | | | |
|---|---|---|---|---|---|---|---|
| 0 ff0 | 32 c68 | 64 990 | 96 740 | 128 550 | 160 3a8 | 192 240 | 224 110 |
| 1 fd0 | 33 c50 | 65 978 | 97 730 | 129 540 | 161 3a0 | 193 238 | 225 100 |
| 2 fb0 | 34 c30 | 66 968 | 98 718 | 130 530 | 162 390 | 194 230 | 226 0f8 |
| 3 f90 | 35 c18 | 67 950 | 99 708 | 131 528 | 163 388 | 195 228 | 227 0f0 |
| 4 f70 | 36 c00 | 68 940 | 100 6f8 | 132 518 | 164 378 | 196 218 | 228 0e8 |
| 5 f50 | 37 be8 | 69 928 | 101 6e8 | 133 508 | 165 370 | 197 210 | 229 0e0 |
| 6 f38 | 38 bd0 | 70 918 | 102 6d8 | 134 4f8 | 166 360 | 198 208 | 230 0d8 |
| 7 f18 | 39 bb8 | 71 900 | 103 6c8 | 135 4f0 | 167 358 | 199 200 | 231 0d0 |
| 8 ef8 | 40 ba0 | 72 8f0 | 104 6b8 | 136 4e0 | 168 350 | 200 1f0 | 232 0c8 |
| 9 ed8 | 41 b88 | 73 8e0 | 105 6a8 | 137 4d0 | 169 340 | 201 1e8 | 233 0c0 |
| 10 ec0 | 42 b70 | 74 8c8 | 106 698 | 138 4c0 | 170 338 | 202 1e0 | 234 0b0 |
| 11 ea0 | 43 b58 | 75 8b8 | 107 688 | 139 4b8 | 171 328 | 203 1d0 | 235 0a8 |
| 12 e80 | 44 b40 | 76 8a0 | 108 678 | 140 4a8 | 172 320 | 204 1c8 | 236 0a0 |
| 13 e68 | 45 b28 | 77 890 | 109 668 | 141 498 | 173 310 | 205 1c0 | 237 098 |
| 14 e48 | 46 b18 | 78 880 | 110 658 | 142 490 | 174 308 | 206 1b8 | 238 090 |
| 15 e30 | 47 b00 | 79 868 | 111 648 | 143 480 | 175 300 | 207 1b0 | 239 088 |
| 16 e10 | 48 ae8 | 80 858 | 112 638 | 144 478 | 176 2f0 | 208 1a0 | 240 080 |
| 17 df0 | 49 ad0 | 81 848 | 113 628 | 145 468 | 177 2e8 | 209 198 | 241 078 |
| 18 dd8 | 50 ab8 | 82 830 | 114 620 | 146 458 | 178 2d8 | 210 190 | 242 070 |
| 19 dc0 | 51 aa8 | 83 820 | 115 610 | 147 450 | 179 2d0 | 211 188 | 243 068 |
| 20 da0 | 52 a90 | 84 810 | 116 600 | 148 440 | 180 2c8 | 212 180 | 244 060 |
| 21 d88 | 53 a78 | 85 800 | 117 5f0 | 149 430 | 181 2b8 | 213 170 | 245 058 |
| 22 d68 | 54 a60 | 86 7e8 | 118 5e0 | 150 428 | 182 2b0 | 214 168 | 246 050 |
| 23 d50 | 55 a50 | 87 7d8 | 119 5d0 | 151 418 | 183 2a0 | 215 160 | 247 048 |

-continued

| | | | | | | | |
|---|---|---|---|---|---|---|---|
| 24 d38 | 56 a38 | 88 7c8 | 120 5c0 | 152 410 | 184 298 | 216 158 | 248 040 |
| 25 d18 | 57 a20 | 89 7b8 | 121 5b0 | 153 400 | 185 290 | 217 150 | 249 038 |
| 26 d00 | 58 a10 | 90 7a8 | 122 5a8 | 154 3f8 | 186 280 | 218 140 | 250 030 |
| 27 ce8 | 59 9f8 | 91 790 | 123 598 | 155 3e8 | 187 278 | 219 138 | 251 028 |
| 28 cc8 | 60 9e0 | 92 780 | 124 588 | 156 3e0 | 188 270 | 220 130 | 252 020 |
| 29 cb0 | 61 9d0 | 93 770 | 125 578 | 157 3d0 | 189 260 | 221 128 | 253 018 |
| 30 c98 | 62 9b8 | 94 760 | 126 568 | 158 3c0 | 190 258 | 222 120 | 254 010 |
| 31 c80 | 63 9a0 | 95 750 | 127 560 | 159 3b8 | 191 250 | 223 118 | 255 008 |

APPENDIX B

In this appendix, we show several division examples carried out in accordance with the preferred embodiment. All numbers are displayed in hexadecimal notation, with the leading bit representing the sign bit, the next 11 bits representing the excess-1023 exponent, and the remaining 52 bits representing the mantissa (with the leading bit not represented for normalized numbers), in accordance with the IEEE binary floating point standard.

Each example starts by showing the numerator and denominator, as well as the rounding mode. The values generated by the preferred embodiment are shown on the left. The values are indented so as to make it easier to find the successive approximations to the quotients, reciprocals, remainders, and errors in the reciprocal. At the end we show the remainder left for the quotient developed according to our invention, and the remainder left by the next-closest approximation to the quotient. Note that our approximation leaves the remainder with the smaller magnitude, as required by the IEEE round to nearest mode of operation.

To the right of each example, is a slightly modified computation, which indicates how a quotient goes awry if one of our rules is not followed:

EXAMPLE 2

Numerator: 3FFAAAAAAAAAAAA8
Denominator: 3FFFFFFFFFFFFFFD
Rounding mode: Nearest

| | |
|---|---|
| y  = 3FE0080000000000 | y = 3FE0080000000000 |
| e  = BF5FFFFFFFFFF9FD | e = BF5FFFFFFFFFF9FD |
| q  = 3FEAB7FFFFFFFFFD | q = 3FEAB7FFFFFFFFFD |
| y1 =3FDFFFF800000003 | y1 = 3FDFFFF800000003 |
| r  =BF6AAAAAAAAAA4FE | r  = BF6AAAAAAAAAA4FE |
| e1 =3ECFFFFFFFFFFFFD | e1= 3ECFFFFFFFFFFFFD |
| q1 =3FEAAAAAAE000000 | q1= 3FEAAAAAAE000000 |
| y2 =3FDFFFFFFFFE0003 | y2= 3FDFFFFFFFFE0003 |
| r1 =BE4AAAAAABFFFFFE | r1= BE4AAAAAABFFFFFE |
| e2 =3DAFFFFFFFFFFFFD | e2= 3DAFFFFFFFFFFFFD |
| q2 =3FEAAAAAAAAAAAAB | q2= 3FEAAAAAAAAAAAAB |
| y3=3FE0000000000001 | y3= 3FE0000000000001 |
| r2 =BC9FFFFFFFFFFFFE | r2= BC9FFFFFFFFFFFFE |
| e3 =3CA0000000000003 | |
| y4=3FE0000000000002 | |
| qf =3FEAAAAAAAAAAAAA | qf= 3FEAAAAAAAAAAAAB |
| final remainder is 3C9FFFFFFFFFFFFC | |
| alternalte rem. is BC9FFFFFFFFFFFFE | |

Here we have the case where the mantissa of the divisor consists of all one bits. If the initial guess to the reciprocal and quotient are underestimates rather than overestimates, the iteration does not converge to the correctly rounded quotient, even though the underestimate was a far superior guess, from a closeness point of view.

EXAMPLE 1

Numerator: 3ff0000000000000
Denominator: 3fffffffffffffff
Rounding mode: Nearest

| | |
|---|---|
| y  = 3FE0080000000000 | y  = 3FE0000000000000 |
| e  = BF5FFFFFFFFFFDFF | e  = BCA0000000000000 |
| q  = 3FE0080000000000 | q  = 3FE0000000000000 |
| y1 =3FDFFFF800000001 | y1= 3FE0000000000000 |
| r  =BF5FFFFFFFFFFDFF | r  = BCA0000000000000 |
| e1 =3ECFFFFFFFFFFFFF | e1= BCA0000000000000 |
| q1 =3FE0000002000000 | q1= 3FE0000000000000 |
| y2 =3FDFFFFFFFFE0001 | y2= 3FE0000000000000 |
| r1 =BE3FFFFFF7FFFFFF | r1= BCA0000000000000 |
| e2 =3DAFFFFFFFFFFFFF | e2= BCA0000000000000 |
| q2 =3FE0000000000001 | q2= 3FE0000000000000 |
| y3=3FE0000000000000 | y3= 3FE0000000000000 |
| r2 =BC9FFFFFFFFFFFFE | r2= BCA0000000000000 |
| e3 =3CA0000000000000 | e3= BCA0000000000000 |
| y4=3FE0000000000000 | y4= 3FE0000000000000 |
| qf =3FE0000000000001 | qf= 3FE0000000000000 |
| final remainder is BC9FFFFFFFFFFFFE | |
| alternalte rem. is 3CA0000000000000 | |

In this example, in the incorrect version at the right, y3 was used to compute qf instead of y4. Note that these two approximations to the reciprocal of the divisor differ by only one bit. Even though y3 was correct to over 64 bits before rounding, it was not computed from an approximation to the reciprocal that was good to within 1 unit in the last place as required by rule 5. Hence it was not sufficiently precise to compute the final quotient.

The above two cases are illustrations of "hard division problems" that implementations of the iterated reciprocal method had gotten wrong in the past. Our method overcomes these difficulties. It is true that the "hard problems" are few and far between. Without our invention most divisions will work out correctly, but our disclosure enables ALL the divisions to be gotten correct regardless of rounding mode, and without conditional fixups at the end.

Furthermore, in the case of exact quotients, the penultimate approximation to the quotient will already be correct, so that the final correction involves adding zero to the correct answer, which is always an exact operation.

We claim:

1. In a data processing system including a memory and having a multiplying circuit connected to an adding circuit, said adding circuit connected to a rounding circuit, and a control circuit connected to the multiplying, adding and rounding circuits, a method for performing floating point division of a dividend by a divisor for producing a quotient having a mantissa of N bits, said method comprising said steps of:
    (1) accessing an initial reciprocal guess of a divisor from a table of divisor reciprocals in said memory by said control circuit;
    (2) computing an initial guess of said quotient by multiplying said reciprocal guess by the dividend in said multiplying circuit and computing a corresponding remainder guess from said initial reciprocal guess by multiplying said divisor by said quotient guess in said multiplying circuit producing a first product followed by adding said dividend to said first product in said connected adding circuit producing a first sum followed by rounding said first sum in said connected rounding circuit, wherein said multiplying, adding and rounding circuits are regulated by said control circuit;
    (3) computing an error parameter and iteratively computing a current reciprocal guess, a current quotient guess and a current remainder guess from said error parameter and said initial reciprocal guess, initial quotient guess and initial remainder guess wherein for each current guess computation a multiplying operation is performed in said multiplying circuit followed by an adding operation in said adding circuit followed by a rounding operation in said rounding circuit;
    (4) repeating step 3 until said precision of said reciprocal guess and said quotient guess exceeds N bits wherein for each current guess computation a multiplying operation is performed in said multiplying circuit followed by an adding operation in said adding circuit followed by a rounding operation in said rounding circuit; and
    (5) computing a final quotient wherein a last current reciprocal guess is multiplied by a last remainder guess in said multiplying circuit providing a final product followed by adding a last current quotient guess to said final product in said adding circuit providing a final sum followed by rounding the final sum in said rounding circuit.

2. A method according to claim 1 wherein said step (1) includes said steps of (1a) determining when said divisor mantissa is all binary ones and (1b) if said divisor mantissa is all binary ones, selecting said initial guess from a set of numbers equal to or greater than an actual magnitude of said reciprocal.

3. A method according to claim 2 wherein said step (5) includes a step of providing an indication that said final quotient is exact when and only when said remainder magnitude is zero.

4. In a data processing system including a memory and a multiplying circuit connected to an adding circuit and said adding circuit connected to a rounding circuit, the multiplying circuit, adding circuit and rounding circuit each connected to a control circuit, a method for performing floating point division of a dividend by a divisor for producing a quotient having a mantissa of N bits, said method comprising said steps of:
    (1) accessing an initial reciprocal guess of a divisor from a value from said memory;
    (2) computing an initial guess of said quotient from said initial guess of said reciprocal by multiplying said reciprocal guess by the dividend in said multiplying circuit as regulated by the control circuit;
    (3) computing an error parameter and computing a current guess of said reciprocal from said error parameter and said initial reciprocal guess wherein for each of said error parameter and current reciprocal guess computation, a multiplying operation is performed in said multiplying circuit followed by an adding operation in said adding circuit followed by a rounding operation in said rounding circuit all regulated by the control circuit;
    (4) computing a current quotient guess from said current guess of said reciprocal wherein for the current quotient guess computation a multiplying operation is performed in said multiplying circuit followed by an adding operation in said adding circuit followed by a rounding operation in said rounding circuit;
    (5) computing a current remainder guess from said current reciprocal guess and said current quotient guess wherein for the current remainder guess computation a multiplying operation is performed in said multiplying circuit followed by an adding operation in said adding circuit followed by a rounding operation in said rounding circuit;
    (6) repeating steps 3, 4 and 5 until said precision of said reciprocal guess and said quotient guess exceeds N bits wherein for each current guess computation a multiplying operation is performed in said multiplying circuit followed by an adding operation in said adding circuit followed by a rounding operation in said rounding circuit;
    (7) computing a final quotient wherein a last current reciprocal guess is multiplied by a last remainder guess in said multiplying circuit to provide a final product followed by adding a last current quotient guess to said final product in said adding circuit to provide a final sum followed by rounding the final sum in said rounding circuit.

5. A method according to claim 4 wherein said step (1) includes said steps of (1a) determining when said divisor mantissa is all binary ones and (1b) if said divisor mantissa is all binary ones, selecting said initial guess from a set of numbers equal to or greater than an actual magnitude of said reciprocal.

6. A method according to claim 5 wherein said step (1) further includes a step of selecting a round-to-nearest operation for rounding said initial reciprocal guess.

7. A method according to claim 6 wherein each of steps (2) through (6) includes a step of rounding by a round-to-nearest operation.

8. A method according to claim 7 wherein said step (7) includes a step of rounding by other than a round-to-nearest operation.

9. A method according to claim 8 wherein said step (7) includes a step of providing an indication that said final quotient is exact when and only when said remainder magnitude is zero.

10. In a data processing system including a memory and a multiplying circuit connected to an adding circuit and said adding circuit connected to a rounding circuit circuit, said multiplying, adding and rounding circuits each connected to a control circuit, a method for performing floating point division of a dividend by a divisor for producing a quotient having a rounded mantissa of N bit precision, said method comprising said steps of:

(1) accessing an initial reciprocal guess of a divisor from a value from said memory;

(2) computing an initial guess of said quotient from said initial guess of said reciprocal by multiplying said reciprocal guess by the dividend in said multiplying circuit and followed by rounding by a round-to-nearest operation in said rounding circuit, wherein said multiplying and rounding circuits are regulated by said control circuit;

(3) computing an error parameter and computing a current guess of said reciprocal from said error parameter and said initial guess of said reciprocal wherein for each of said error parameter and current reciprocal guess computations, a multiplying operation is performed in said multiplying circuit followed by an adding operation in said adding circuit followed by a round-to-nearest operation in said rounding circuit;

(4) computing a current quotient guess from said current guess of said reciprocal wherein for said current quotient guess computation, a multiplying operation is performed in said multiplying circuit followed by an adding operation in said adding circuit followed by a round-to-nearest operation in said rounding circuit;

(5) computing a remainder guess from said current reciprocal guess and said current quotient guess wherein for said remainder guess computation, a multiplying operation is performed in said multiplying circuit followed by an adding operation in said adding circuit followed by a round-to-nearest operation in said rounding circuit;

(6) repeating steps 3, 4 and 5 until precision of said reciprocal guess and said quotient guess exceeds N bits wherein for each current guess computation a multiplying operation is performed in said multiplying circuit followed by an adding operation in said adding circuit followed by a rounding operation in said rounding circuit; and (7) computing a final quotient wherein a last current reciprocal guess is multiplied by a last remainder guess in said multiplying circuit providing a final product followed by adding a last current quotient guess to said final product in said adding circuit to provide a final sum followed by rounding by an operation other than a round-to-nearest operation in said rounding circuit.

11. A method according to claim 10 wherein said step (1) includes said steps of (1a) determining when said divisor mantissa is all binary ones and (1b) if said divisor mantissa is all binary ones, selecting said initial guess from a set of numbers equal to or greater than an actual magnitude of said reciprocal.

12. A method according to claim 11 wherein said step (1) further includes a step of selecting a round-to-nearest operation for rounding said initial reciprocal guess.

13. A method according to claim 12 wherein said step (7) includes a step of providing an indication that said final quotient is exact when and only when said remainder magnitude is zero.

14. In a data processing system an apparatus for performing floating point division of a dividend by a divisor for producing a quotient having a mantissa of N bits, said apparatus comprising:

a memory;

a multiplying circuit;

an adding circuit connected to said multiplying circuit;

a rounding circuit connected to said adding circuit;

a control circuit connected to said multiplying circuit, said adding circuit and said rounding circuit;

means for accessing an initial reciprocal guess of said divisor from a table of divisor reciprocals in said memory;

means for computing an initial guess of said quotient by multiplying said reciprocal guess by the dividend in said multiplying circuit and computing a corresponding remainder guess from said initial guess of said reciprocal by multiplying said divisor by said quotient guess in said multiplying circuit producing a first product followed by adding said dividend to said first product in said connected adding circuit producing a first sum followed by rounding said first sum in said connected rounding circuit, wherein said multiplying, adding and rounding circuits are regulated by said control circuit;

means, connected to said multiplying circuit, said adding circuit, said rounding circuit and said control circuit, for computing an error parameter and iteratively computing a current reciprocal guess, a current quotient guess and a current remainder guess from said error parameter and said initial reciprocal guess, initial quotient guess and initial remainder guess until said precision of said reciprocal guess and said quotient guess exceeds N bits wherein for each error parameter and current guess computation a multiplying operation is performed in said multiplying means followed by an adding operation in said adding circuit followed by a rounding operation in said rounding circuit;

means for computing a final quotient wherein a last current reciprocal guess is multiplied by a last remainder guess in said multiplying circuit providing a final product followed by adding a last current quotient guess to said final product in said adding circuit providing a final sum followed by rounding the final sum in said rounding circuit.

15. An apparatus according to claim 14 wherein said means for accessing includes means for determining when said divisor mantissa is all binary ones and means for selecting said initial guess from a set of numbers equal to or greater than an actual magnitude of said reciprocal in response thereto.

16. An apparatus according to claim 15 wherein said means for computing a final quotient includes means for providing an indication that said final quotient is exact when and only when said remainder magnitude is zero.

17. In a data processing system an apparatus for performing floating point division of a dividend by a divisor for producing a quotient having a mantissa of N bits, said apparatus comprising:

a memory;

a multiplying circuit;

an adding circuit connected to said multiplying circuit;

a rounding circuit connected to said adding circuit;

a control circuit connected to said multiplying circuit, said adding circuit and said rounding circuit;

means for accessing an initial reciprocal guess of said divisor from a value from said memory;

means for computing an initial guess of said quotient from said initial reciprocal guess by multiplying said reciprocal guess by the dividend in said multiplying circuit as regulated by the control circuit;

means, connected to said multiplying circuit, said adding circuit and said rounding circuit, for computing an error parameter and computing a current guess of said reciprocal from said error parameter and said initial guess of said reciprocal wherein for each of said error parameter and current reciprocal guess computation, a multiplying operation is performed in said multiplying circuit followed by an adding operation in said adding circuit followed by a rounding operation in said rounding circuit all regulated by the control circuit;

means, connected to said multiplying circuit, said adding circuit, said rounding circuit and said control circuit, for computing a current quotient guess from said current guess of said reciprocal wherein for the current quotient guess computation a multiplying operation is performed in said multiplying circuit followed by an adding operation in said adding circuit followed by a rounding operation in said rounding circuit;

means, connected to said multiplying circuit, said adding circuit, said rounding circuit and said control circuit, for computing a current remainder guess from said current reciprocal guess and said current quotient guess wherein for the current remainder guess computation a multiplying operation is performed in said multiplying circuit followed by an adding operation in said adding circuit followed by a rounding operation in said rounding circuit;

means, connected to said multiplying circuit, said adding circuit, said rounding circuit and said control circuit, for increasing precision of said current reciprocal, quotient and remainder guesses until said precision of said reciprocal guess and said quotient guess exceeds N bits wherein for each current guess computation a multiplying operation is performed in said multiplying circuit followed by an adding operation in said adding circuit followed by a rounding operation in said rounding circuit;

means, connected to said multiplying circuit, said adding circuit, said rounding circuit and said control circuit, for computing a final quotient wherein a last current reciprocal guess is multiplied by a last remainder guess in said multiplying circuit to provide a final product followed by adding a last current quotient guess to said final product in said adding circuit to provide a final sum followed by rounding the final sum in said rounding circuit.

18. An apparatus according to claim 17 wherein said means for computing said initial reciprocal guess includes a means for determining when said divisor mantissa is all binary ones and means for selecting said initial guess from a set of numbers equal to or greater than an actual magnitude of said reciprocal in response thereto.

19. An apparatus according to claim 18 wherein said means for computing said initial reciprocal further includes means for selecting a round-to-nearest operation for rounding said initial reciprocal guess.

20. An apparatus according to claim 19 wherein each means for computing current guesses includes means for rounding by a round-to-nearest operation.

21. An apparatus according to claim 20 wherein means for computing said final quotient includes means for rounding by other than a round-to-nearest operation.

22. An apparatus according to claim 21 wherein said means for computing said final quotient includes means for providing an indication that said final quotient is exact when and only when said remainder magnitude is zero.

23. In a data processing system an apparatus for performing floating point division of a dividend by a divisor for producing a quotient having a rounded mantissa of N bit precision, said apparatus comprising:

a memory;

a multiplying circuit;

an adding circuit connected to said multiplying circuit;

a rounding circuit connected to said adding circuit;

a control circuit connected to said multiplying circuit, said adding circuit and said rounding circuit;

means for accessing an initial reciprocal guess of said divisor from a value from said memory;

means for computing an initial guess of said quotient from said initial guess of said reciprocal by multiplying said reciprocal guess by the dividend in said multiplying circuit and followed by rounding by a round-to-nearest operation in said rounding circuit, wherein said multiplying and rounding circuits are regulated by said control circuit;

means, connected to said multiplying circuit, said adding circuit, said rounding circuit and said control circuit, for computing an error parameter and computing a current guess of said reciprocal from said error parameter and said initial guess of said reciprocal wherein for each error parameter and current reciprocal guess computation, a multiplying operation is performed in said multiplying circuit followed by an adding operation in said adding circuit followed by a round-to-nearest operation in said rounding circuit and said multiplying, adding and rounding circuits are regulated by said control circuit;

means, connected to said multiplying circuit, said adding circuit, said rounding circuit and said control circuit, for computing a current quotient guess from said current guess of said reciprocal wherein for said current quotient guess computation, a multiplying operation is performed followed by an adding operation followed by rounding by a round-to-nearest operation in said rounding circuit;

means, connected to said multiplying circuit, said adding circuit, said rounding circuit and said control circuit, for computing a remainder guess from said current reciprocal guess and said current quotient guess wherein for said remainder guess computation, a multiplying operation is performed in said multiplying circuit followed by an adding operation in said adding circuit followed by a round-to-nearest operation in said rounding circuit;

means for increasing precision of said current guesses of said reciprocal and quotient until said precision of said reciprocal guess and said quotient guess exceeds N bits wherein for each current guess computation a multiplying operation is performed in said multiplying circuit followed by an adding operation in said adding circuit followed by a rounding operation in said rounding circuit; and means for computing a final quotient wherein a last current reciprocal guess is multiplied by a last remainder guess in said multiplying circuit providing a final product followed by adding a last current quotient guess to said final product in said adding circuit to provide a final sum followed by rounding by an operation other than a round-to-nearest operation in said rounding circuit.

24. An apparatus according to claim 23 wherein said means for computing said initial guess of said reciprocal includes means for determining when said divisor mantissa is all binary ones and means for selecting said initial guess from a set of numbers equal to or greater than an actual magnitude of said reciprocal in response thereto.

25. An apparatus according to claim 24 wherein said means for computing said initial guess of said reciprocal further includes means for selecting a round-to-nearest operation for rounding said initial reciprocal guess.

26. An apparatus according to claim 25 wherein said means for computing said final quotient includes a means for providing an indication that said final quotient is exact when and only when said remainder magnitude is zero.

27. A data processing system for performing a division operation on a dividend and a divisor, said system comprising:

a memory;

a multiplying circuit;

an adding circuit connected to said multiplying circuit;

a rounding circuit connected to said adding circuit;

a control circuit connected to said memory, multiplying circuit, adding circuit and rounding circuit and including means for obtaining an estimate of a divisor reciprocal from said memory, means for controlling computing of a quotient estimate and remainder estimate, and means for controlling repetitively computing an error parameter and iteratively recomputing current quotient estimates and current remainder estimates from a current error parameter until a previously specified quotient bit precision has been obtained.

28. A data processing system of claim 27 wherein said means for controlling computing and means for controlling repetitively computing provides a sequence of a multiplication operation in said multiplying circuit followed by an addition operation in said adding circuit followed by a rounding operation in said rounding circuit.

* * * * *